Figure 3:
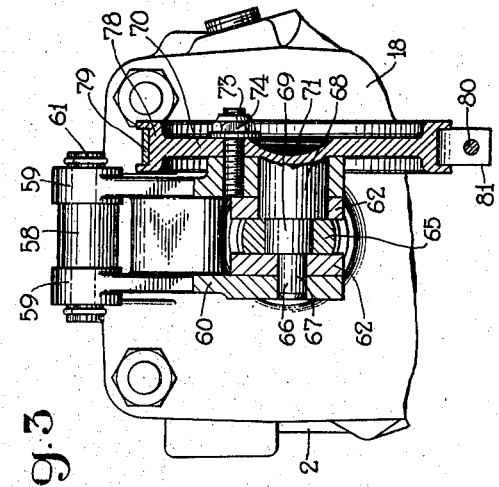

June 29, 1948.    J. A. CAMPBELL ET AL    2,444,244
CONTROL MECHANISM
Filed Dec. 23, 1944

INVENTORS
James A. Campbell
John B. Hull
Roy R. Stevens
BY *A. M. Higgins*
ATTORNEY Patented June 29, 1948

2,444,244

UNITED STATES PATENT OFFICE 2,444,244

CONTROL MECHANISM

James A. Campbell, Wilmette, Ill., John B. Hull, Berkeley, Calif., and Roy R. Stevens, Forest Hills, Pa., assignors to The Westinghouse Air Brake Company, Wilmerding, Pa., a corporation of Pennsylvania Application December 23, 1944, Serial No. 569,545

4 Claims. (Cl. 74—110)

This invention relates to control apparatus and more particularly to means for controlling the adjustment of a device, such as a speed governor for controlling the speed of an internal combustion engine.

Certain internal combustion engines are provided with speed governors of the type embodying adjustable control spring means arranged to oppose centrifugal action of revolving weights for regulating the supply of fuel to the engine, and thereby the speed of the engine, in accordance with the adjusted force of said spring means. The adjustment of the governor spring means may be controlled by resilient means in the form of an air motor embodying a power piston connected to the spring means and operable by fluid under pressure to vary the pressure of said spring means in proportion to the pressure of such fluid, to thereby vary the engine speed correspondingly.

With a structure of the above type, if the pressure of fluid on the power piston is increased, the governor will operate to increase the fuel supply to the engine to cause acceleration thereof. As the engine approaches the desired speed, the governor will act to reduce the supply of fuel to the engine in order to prevent the speed exceeding that desired. However, as the engine speed is increased, the increased centrifugal action of the governor weights will increase the reactive force of the spring means on the power piston which may cause said piston to yield or move from its selected position against the controlling air pressure, and such yielding will change the adjustment of the spring means so as to permit the governor to operate to reduce the fuel supply to a degree greater than desired or would otherwise occur. As a result, the engine speed may then reduce to a degree below the normal or chosen speed and cause another change in the reactive force of the spring means on the piston and possibly another change in position of said piston and in the adjustment of said spring means to again increase the fuel supply to the engine to increase its speed. This oscillatory operation of the engine, the governor and of the governor control piston, commonly known as "hunting," may thus continue for a certain interval of time before equilibrium between the centrifugal force of the governor, the force of the spring means and the pressure of fluid on the power piston is obtained, at which time the engine will be operating at the chosen or normal speed.

Oscillatory or "hunting" operation of an engine and a governor and the length of time during which such action may continue, may be even greater than above described in case the pressure of fluid on the governor spring adjusting piston is controlled by a self-lapping valve mechanism which will become unbalanced in response to changes in position of the power piston, since as the engine and governor oscillate or "hunt" as above described, such unbalancing may result in a greater amplitude of "hunting" and a longer period of time before equilibrium will be obtained between the centrifugal force of the governor, the pressure of the governor control spring means, the pressure of fluid on the control piston and the controlling forces on the self-lapping mechanism.

Further, oscillatory or "hunting" operation of an engine, the governor, the governor control power piston, and a self-lapping valve mechanism for controlling the pressure of fluid on said piston may be of relatively small degree in case of operation of said mechanism to provide a relatively small degree of change in engine speed, but may be relatively severe when said mechanism is operated to initiate a relatively great degree of change in engine speed, or in case the load on the engine is suddenly removed.

One object of the invention is therefore the provision of mechanism for adjusting a device, such as an engine speed governor, which is so constructed as to prevent change in such adjustment by force from the device being controlled.

According to this object we provide a locking means in the connection between the fluid controlled power piston and the governor control spring means which is effective to prevent changes in the adjusted position of said piston, by surges of increase in the reactive force of the governor control spring means on the power piston incident to acceleration of the engine, whereby the chosen adjustment of said spring means will be maintained to minimize "hunting" of the governor and engine. Upon deceleration of the engine the reduction in the reactive force of the governor control spring means and its effect on the power piston and thereby upon "hunting" of the governor is of relatively small degree because of the reduced centrifugal effect of the governor on said spring means at the reduced speed, and therefore, unless desired, need not be considered in connection with "hunting" as long as the power piston means is held against change in adjustment by the surges of pressure increase. However, according to another object of the invention the locking means may also be effective, in the event it is desired, to hold the piston means against any possible change in adjustment incident to a reduction in pressure of the governor control spring means upon deceleration of the engine.

A more specific object of the invention is the provision of improved means for connecting a member to be controlled to a control member for preventing movement of the controlled member except by the control member, and which, if desired, may provide for a certain lost motion of the control member relative to the controlled member.

Other objects and advantages will be apparent from the following more detailed description of the invention.

Figure 1:
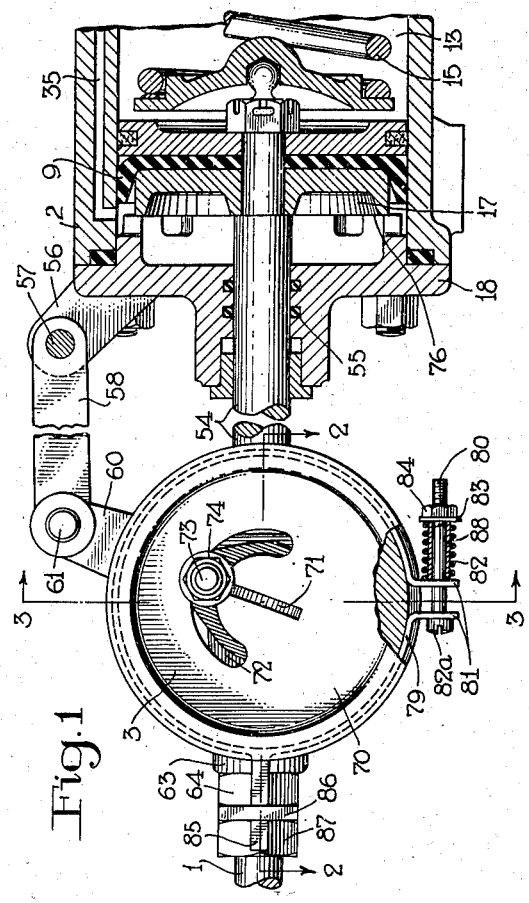
Figure 2:
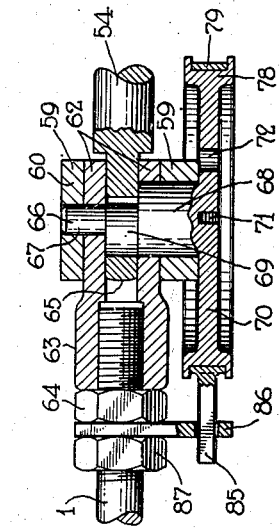

In the accompanying drawing: Fig. 1 is a side elevational view, partly in section, of a control mechanism embodying the invention; and Figs. 2 and 3 are sectional views taken respectively on the lines 2—2 and 3—3 in Fig. 1.

Description

In the drawing, the reference numeral 1 designates a rod to be adjusted for adjusting any desired device such as the control spring of a speed governor such as above described; the reference numeral 2 designates a portion of a device, such as a fluid motor, for adjusting the rod 1, and the reference numeral 3 designates a device interposed in the connection between said motor and rod and embodying the invention.

The fluid motor 2 may be like that fully disclosed in Patent 2,411,748, issued on November 26, 1946 to C. S. Kelley, and since reference may be made to said patent only a portion of said motor is shown in the drawing. The motor comprises a casing containing a power piston 9 subject on one side to pressure of a regulating spring 15 in a non-pressure chamber 13 and subject on the opposite side to pressure of fluid in a control chamber 17 provided between said piston and a cover member 18 secured to the casing. Chamber 17 is connected to a control passage through which fluid under pressure is adapted to be supplied to and released from said chamber for positioning piston 9 against spring 15. The numeral 77 designates a stop for engagement by piston 9 to limit movement thereof in the direction of the left hand.

An operating rod 54 for the governor adjusting rod 1 is connected to the piston 9 for movement thereby. The rod 54 projects through pressure chamber 17 and a suitable bore in the cover member 18, suitable seals 55 being provided in said member in sealing contact with said rod for preventing leakage of fluid under pressure from chamber 17.

Projecting from the cover member 18 is a bracket 56 and connected to said bracket by a pin 57 is one end of a rockable link 58. The opposite end of link 58 is disposed between the ends of two arms 59 of a lever or link 60 and is rockably connected to said arms by a pin 61. Disposed between the opposite ends of the two arms 59 are jaws 62 provided on one end of a link 63. The opposite end of link 63 is operatively connected to the governor adjusting rod 1 by screw-threaded engagement. A lock nut 64 provided on rod 1 engages the adjacent end of link 63 for securing said rod in an adjusted position. The piston rod 54 has a tongue 65 disposed between the jaws 62.

The piston rod 54 is connected to the link 63 and to the ends of arms 59 by a pivot pin 66 having an axial portion 67 extending through and operatively connecting one of the arms 59 to the adjacent jaw 62. The pivot pin 66 has another axial portion 68 extending through and operatively connecting the other arm 59 to the adjacent jaw 62. The two axial portions 67 and 68 are connected by an eccentric portion 69 which extends through an opening in the tongue 65 of the piston rod 54 and operatively connects said rod to the pivot pin 66 and thereby to the governor adjusting rod 1.

The axial portion 68 of the pivot pin 66 is of greater diameter than the axial portion 67 and bears at its inner end against the adjacent face of the piston rod tongue 65. On the outer end of the axial portion 68 is an adjusting disk 70 bearing against the outer surface of the adjacent arm 59. This disk is provided across its outer face with a screw-driver slot 71 for turning the disk and pivot pin 66 relative to the piston rod 54 and other connected parts. The disk 70 also has a semi-circular slot 72 through which extends a stud 73 one end of which is secured in the adjacent lever arm 59. A nut 74 on stud 73 is provided for securing the disk 70 and thereby the pivot pin 66 to the adjacent arm 59 of lever 60 for movement with said lever. Loosening of nut 74 provides for rotary adjustment of the pivot pin 66 relative to the lever 60 and thereby angular adjustment of eccentric portions 69 of the pin relative to the end of the piston rod 54.

When fluid under pressure is supplied through passage 35 to chamber 17 it will move piston 9 and rod 54 in the direction of the right hand against spring 15, and this movement of said rod will act through the pivot pin 66 to turn the lever or link 60 about its connection with link 58 for pulling the governor adjusting rod 1 in a corresponding direction, it being noted that the disk 3 will turn with said lever and relative to the piston rod 54 and governor adjusting rod 1 during such movement, since said disk is secured by stud 73 to said lever for movement therewith. On the other hand, if the pressure of fluid in chamber 17 is reduced, spring 15 will actuate piston 9 and rod 54 to move rod 1 in the same direction, the disk 3 again turning with the lever 60. It will therefore be seen that any desired positioning of rod 1 may be obtained by providing the proper pressure of fluid in chamber 17.

The opening in rod 54 in which the eccentric portion 69 of pin 66 is disposed is elongated slightly in the diretcion of the length of said rod to permit a limited movement of said rod and piston 9 relative to rod 1 in case of leakage of fluid under pressure to or from the power chamber 17.

The disk 70 which is secured for movement with lever 60 is provided with an annular flange 78 in the peripheral surface of which is an annular groove, the bottom wall of which constitutes a braking surface of a brake drum. Disposed in this groove and engaging the braking surface thereof is an annular brake band or shoe 79. The two ends of the brake band are preferably disposed below the piston rod 54, as viewed in the drawing, and at substantial right angles to the axis of governor adjusting rod 1, and said ends are connected together by a bolt 80 extending through suitable openings in out-turned ears 81 provided at the ends of the band. A head 82a on one end of bolt 80 engages the outer surface of one of the ears 81, while encircling the bolt and engaging the opposite surface of the other ear 81 is a compression spring 82. A washer 83 is mounted over the bolt against the outer end of spring 82 and a nut 84 having screw-threaded engagement with the bolt 80 bears against the washer 83. A sleeve 88 mounted on bolt 80 between washer 83 and the adjacent brake band ear 81 is provided to limit the degree of compression of spring 82 by nut 84, whereby a desired degree of braking force between the brake band and the flange 78 of disk 70 may be obtained.

Substantially ninety degrees from one end of the brake band 79, said band is provided with an anchor arm or finger 85 which freely extends through an opening provided in a member 86 which is mounted on the rod 1 and clamped in place between the nut 64 and a jam nut 87.

It will be seen that the brake band or shoe 79 is secured against turning by the connection between arm 85 and the governor adjusting rod 1, while the disk 70, constituting a brake drum which is secured for movement with the lever 60, will turn in and relative to said brake band upon longitudinal movement of the piston rod 54 to change the longitudinal position of the governor adjusting rod 1.

The brake band 79 is so arranged on the drum 70 and the anchor arm 85 is so disposed with respect to the ends of said band, that for example, about three quarters of the length of said band will be effective, operating on the well known "wrap up" principle, to produce a braking effect to oppose clockwise rotation of the brake drum or disk 70 and thereby to oppose movement of the adjusting rod 1 in the direction of the left hand. Upon such rotation of disk 70, the other quarter of the brake band will tend to release from the drum and thereby produce relatively little braking effect. Upon rotation of the brake drum or disc 70 in a counterclockwise direction, the one quarter of the band 79 will oppose such rotation, while the three quarter portion of the band will be substantially ineffective.

With the adjusting rod 1 connected to control an engine governor, the frictional force between the disc 70 and the three quarters portion of brake band 79 will secure the disc 70 and thereby rod 1 against change in adjustment by a force from the governor acting to pull the rod 1 in the direction of the left hand. The one-quarter portion of the band will, on the other hand, hold the drum 70 and rod 1 against change in adjustment incident to minor reductions in pulling force from the governor on rod 1.

It will be apparent that the braking force created by the three-quarters of the brake band 79 on disc 70 will oppose adjustment of rod 1 by the power piston 9 upon release of fluid under pressure from chamber 17. The pressure of spring 15 may be sufficient by itself however to effect such change in adjustment, or if desired, the force from the governor may be employed as an aid to spring 15 to rotate disc 70 in a clockwise direction relative to band 79 to cause deceleration of the engine.

Moreover, the braking force created by the one-quarter of the brake band will oppose adjustment of rod 1 by an increase in pressure of fluid in chamber 17 to cause acceleration of the engine. This latter braking force is however relatively small, and will have substantially no effect upon such adjustment.

After the rod 1 has been adjusted to a chosen position by operation of the fluid motor 2, the frictional force between the brake band 79 and disc 70 will hold said rod against change in adjustment as long as there is no change in the pressure of controlling fluid in chamber 27. Under this condition the elongated slot in the power piston rod 54 in which the eccentric 69 is disposed, is effective to permit the power piston 9 to freely oscillate, in case of leakage of fluid under pressure either to or from chamber 17, as hereinbefore described, relative to the rod 1 and thus without effect upon the adjusted position of said rod.

Summary

It will now be seen that we have provided a control mechanism embodying a structure adapted to be interposed in the connection between a device to be adjusted such as a speed governor and resilient means such as a fluid motor for adjusting said device, which is operative to hold said device in any chosen adjusted position against force from said device which would tend to change said position. The structure is operative however in response to operation of the fluid motor to render the device adjustable by said motor. This structure is preferably in the form of a brake band having frictional contact with a relatively rotatable brake drum and it has been found that said structure will accomplish the desired end. A lost motion connection is provided between the structure and the power piston of the fluid motor to allow so called "hunting" or "pumping" of said motor, in case of leakage of fluid under pressure either to or from the power piston chamber, relative to and without changing the adjusted position of the governor adjusting rod 1.

Having now described the invention, what we claim as new and desire to secure by Letters Patent is:

1. In combination, two coaxially aligned longitudinally movable rods, one constituting a rod to be controlled and the other constituting a control rod, pivot means operatively connecting said rods, said control rod being operable upon movement thereof in either direction to actuate said pivot means to move said controlled rod in a corresponding direction, a link rockable about a fulcrum at one end, means securing said pivot means to the opposite end of said link against movement relative to said link, whereby said pivot means will turn relative to said rods upon rocking of said link by movement of said rods, locking means comprising a brake member secured to turn with said pivot means, brake means frictionally engaging said brake member, and means securing said brake member to one of said rods against rotation relative to said rods, friction between said brake means and brake member being adapted to prevent rotation of said brake member by force applied to said pivot means from said controlled rod but to permit rotation of said brake member by movement of said control rod.

2. In combination, two coaxially aligned longitudinally movable rods, one constituting a rod to be controlled and the other constituting a control rod, pivot means operatively connecting said rods, said control rod being operable upon movement thereof in either direction to actuate said pivot means to move said controlled rod in a corresponding direction, a link rockable about a fulcrum at one end, means securing said pivot means to the opposite end of said link against movement relative to said link, whereby said pivot means will turn relative to said rods upon rocking of said link by movement of said rods, locking means comprising a brake member secured to turn with said pivot means, brake means frictionally engaging said brake member, and means securing said brake member to one of said rods against rotation relative to said rods, friction between said brake means and brake member being adapted to prevent rotation of said brake member by force applied to said pivot means from said controlled rod but to permit rotation of said brake member by movement of said control rod, the connection between said control rod and pivot means providing for a chosen degree of longitudinal movement of said control rod relative to said pivot means.

3. In combination, two coaxially aligned longitudinally movable rods, one constituting a rod to be controlled and the other constituting a control rod, pivot means operatively connecting said rods, said control rod being operable upon movement thereof in either direction to actuate said pivot means to move said controlled rod in a corresponding direction, a link rockable about a fulcrum at one end, means securing said pivot means to the opposite end of said link against movement relative to said link, whereby said pivot means will turn relative to said rods upon rocking said link by movement of said rods, locking means comprising a brake drum secured to turn with said pivot means, a brake band encircling and engaging said drum, means resiliently forcing opposite ends of said band together creating frictional force between said band and drum, and means connected to said controlled rod and secured to said band closer to one end than to the other and operable to render the major portion of the length of said band effective to hold said drum and said controlled rod against movement by a pulling force exerted on said controlled rod, said locking means being ineffective to prevent adjustment of said controlled rod by said control rod.

4. In combination, two coaxially aligned longitudinally movable rods, one constituting a rod to be controlled and the other constituting a control rod, pivot means operatively connecting said rods, said control rod being operable upon movement thereof in either direction to actuate said pivot means to move said controlled rod in a corresponding direction, a link rockable about a fulcrum at one end, means securing said pivot means to the opposite end of said link against movement relative to said link, whereby said pivot means will turn relative to said rods upon rocking of said link by movement of said rods, locking means comprising a brake drum secured to turn with said pivot means, a brake band encircling and engaging said drum, means resiliently forcing opposite ends of said band together creating frictional force between said band and drum, and means connected to said controlled rod and secured to said band closer to one end than to the other to hold said drum and controlled rod against movement by force applied to said controlled rod other than by said control rod, said locking means being ineffective to prevent adjustment of said controlled rod by said control rod.

JAMES A. CAMPBELL.
JOHN B. HULL.
ROY R. STEVENS.

REFERENCES CITED

The following references are of record in the file of this patent:

UNITED STATES PATENTS

| Number | Name | Date |
|---|---|---|
| 1,614,629 | Quick et al. | Jan. 18, 1927 |
| 1,928,855 | Hamlin | Oct. 3, 1933 |
| 2,102,007 | Kimball | Dec. 14, 1937 |
| 2,294,967 | Eberhardt | Sept. 8, 1942 |
| 2,295,731 | Grover | Sept. 15, 1942 |
| 2,324,475 | Arens | July 20, 1942 |
| 2,365,247 | Carlton | Dec. 19, 1944 |